United States Patent [19]
Castelaz

[11] Patent Number: 5,499,195
[45] Date of Patent: Mar. 12, 1996

[54] FINE-GRAINED MULTI-PLANAR CLUTTER REJECTION PROCESSOR

[75] Inventor: Patrick F. Castelaz, Yorba Linda, Calif.

[73] Assignee: Hughes Aircraft Company, Los Angeles, Calif.

[21] Appl. No.: 230,041

[22] Filed: Apr. 19, 1994

[51] Int. Cl.$^6$ .................................................. G01S 13/52
[52] U.S. Cl. .......................... 364/516; 342/159; 342/160; 364/517; 364/574; 382/103
[58] Field of Search .................................... 342/159, 160, 342/162; 364/516, 517, 574; 382/103

*Primary Examiner*—Edward R. Cosimano
*Attorney, Agent, or Firm*—W. K. Denson-Low

[57] ABSTRACT

A fine grained multi-planar clutter rejection processor (10) for correlating multiple sets of data. The processor (10) maps each set of data onto a plurality of arrays (28–34). The data includes target data which is correlated between sets and clutter which is uncorrelated between sets of data. The system also includes a means for shifting (40) the positions of the second and subsequent arrays in a pattern which is larger for each successive array. In addition, a correlation identification unit (78) identifies the coordinate locations in the first array (28) which contain data points and which also contain data points in subsequent arrays in their shifted positions. In this way, data points identified in this manner are correlated and the remaining data points can be discarded as clutter. The processor (10) system is able to handle a very large number of data points per scan (over 100,000) over a high number of scans (such as eight). Due to its highly parallel approach, the total processing time is completely independent of the number of data points or scans.

13 Claims, 5 Drawing Sheets

WF - SPRIAL COMPARISON
.05 CLUTTER / SQ MI .25 MILES / CELL

| MAX SPEED | WAVE FRONT | SPRIAL |
|---|---|---|
| 500 | 1 OUT OF 143 | 1 OUT OF 143 |
| 1000 | 2 OUT OF 122 | 1 OUT OF 122 |
| 1500 | 10 OUT OF 99 | 0 OUT OF 99 |
| 2000 | 54 OUT OF 128 | 4 OUT OF 128 |

200x200 CELLS / SCAN
3 SCANS PROCESSED

FINE-GRAINED MULTI-PLANAR CLUTTER REJECTION PROCESSOR

This invention was made with Government support under Contract DASG60-91-C-0005 awarded by the Department of the Army. The Government has certain rights in this invention.

BACKGROUND OF THE INVENTION

1. Technical Field

The present invention relates generally to a system for eliminating clutter in multi-scan data and more particularly to a system which identifies correlated data between scans by detecting alignment of data after successive shifts in the positions of the scans.

2. Discussion

The processing of multiple sets of two dimensional data to detect correlations between sets is an important computational task in many applications. Where the number of data points is large the processing time can quickly grow so as to preclude real-time processing. One example is the task of correlating multiple scans of two dimensional data gathered by one or more scanning sensors covering a common surveillance region. Currently this problem does not a have practical real-time solution where the number of plots per scan is over one hundred thousand.

In a typical application, it is desired to track nearly constant velocity targets in extremely high uncorrelated clutter fields over as many as eight scans. For example, clutter densities may be in excess of 0.3 objects/mile$^2$. With more than one hundred thousand clutter plots per scan, it is necessary to reduce the clutter level by three to four orders of magnitude for the remaining clutter objects to be handled by conventional techniques. Conventional technologies would include, for example, alpha-beta, Kalman, and multi-hypothesis trackers. Traditional tracking techniques (such as Kalman techniques) are inadequate and computationally overwhelmed when addressing scenarios of this size, primarily due to the sequential nature of such approaches. Other prior techniques for processing this class of problem include wave front processors. These are processors which perform correlations by emitting waves at separate times from intermediate scan detections, as represented in 2-D cellular automata structures. The intersections of these waves with detection in previous and subsequent scans are characterized by a central controller to determine if the detection belongs to a valid track. This process is bottle-necked by the central controller and the potentially time-consuming nature of sequentially emitting hundreds of thousands of waves.

Thus, it would be desirable to provide a system which can process multiple scans of two dimensional data to detect correlation among large sets of data in a completely parallel manner. Further, it would be desirable to provide such a system which can accomplish this task in real-time. Furthermore it would be desirable to provide such a system in which the total processing time does not increase with the number of data points, or scans.

SUMMARY OF THE INVENTION

Pursuant to the present invention, an information processor is provided which is capable of detecting correlations among multiple scans of two dimensional data for large numbers of data. The technique of the present invention is based on the geometry of the correlated points. That is, where correlated points represent constant velocity targets and uncorrelated clutter represents non-constant velocity targets, it can be observed that when the scans are superimposed on each other, correlated data points across the scans will be equidistant and will lie along a straight line. Uncorrelated points representing non-constant velocity points will not be equidistant or will not form a straight line. This observable geometric characteristic of correlated data is used by the present invention to recognize correlated data.

In accordance with one aspect of the present invention the system includes a plurality of arrays, each including a mapping of one of the sets of data. The arrays each have coordinate locations, some of which contain data points. The data points include either target data which is correlated between sets or clutter which is uncorrelated between sets. Also, the system includes a means for shifting the positions of the second and subsequent arrays with respect to the first array so that the second and subsequent arrays move in a generally spiral pattern which is larger for each successive array. In this process, each shifted array is assigned a new reference coordinate location corresponding to its new location with respect to the first array. The system also includes a means for identifying the coordinate locations in the first array which contain data points and which also containing data points in subsequent arrays in their reference coordinate locations. In this way, the system identifies data points in successive scans which are correlated with each other.

In accordance with another embodiment of the present invention, a method for correlating multiple sets of data is taught. The method begins with the step of mapping each of the sets of data into a separate array. The arrays each have coordinate locations, some of which contain data. The data includes either target data which is correlated between sets, or clutter which is uncorrelated between sets. The method then shifts positions of the second and subsequent arrays with respect to the first array so that the second and subsequent arrays move in a generally spiral pattern. This spiral pattern is larger for each successive array by a predetermined amount. During this process each data point in each shifted array is assigned a new reference coordinate location corresponding to its new location with respect to the first array. Finally, the method identifies at each shift the coordinate locations in the first array which contain data points and which also contain data points in the subsequent arrays in their corresponding reference coordinate locations. In this way, the data points in the identified coordinate locations are correlated with each other.

The result is a system and method which correlates multiple scans of two dimensional data which, due to its highly parallel processing, can perform correlation for very large numbers of data points across multiple scans. In fact, the total processing time of the present invention is independent of the number of data points or scans.

BRIEF DESCRIPTION OF THE DRAWINGS

The various advantages of the present invention will become apparent to one skilled in the art by reading the following specification and by reference to the following drawings in which:

FIG. 6 is a table indicating the results of a comparison of a wave front processor with the present invention.

DESCRIPTION OF THE PREFERRED EMBODIMENT

Figure 1:
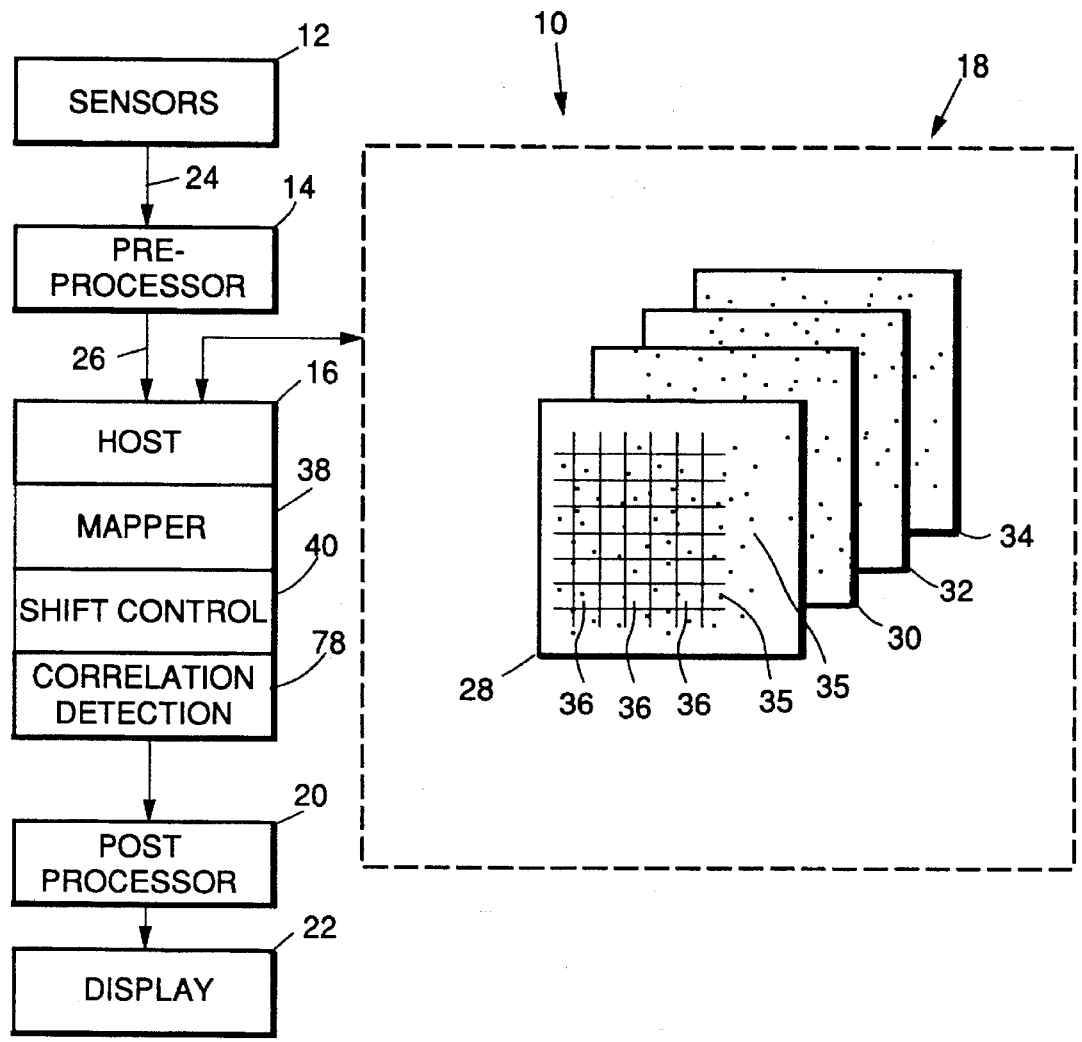
FIG. 1 is an overall system diagram of the present invention.

In the preferred embodiment the present invention is adapted to be used as a clutter rejection filter which compares data across scans of two dimensional data gathered by one or more scanning sensors covering a common surveillance region. More specifically, the preferred embodiment addresses the track initiation problem for noisy, nearly constant-velocity targets in very high uncorrelated clutter over a relatively high number of scans. In one embodiment, for example, eight scans are processed. However, it should be noted that there is no inherent limit to the number of scans processed by the present invention. For example, the invention may handle clutter densities in excess of 0.3 objects/mi$^2$ yielding more than one hundred thousand clutter plots per scan. In this application, the present invention can reduce the clutter level by three to four orders of magnitude. This is sufficient for remaining clutter objects to be handled by conventional techniques. As a result, the present invention surpasses known techniques in its ability to handle and reject massive amount of clutter while retaining target information and greatly reducing clutter. Referring now to FIG. 1, the fine-grained multi-planar clutter rejection processor 10 of the present invention is shown. The main components of the clutter rejection processor 10 include sensors 12, a preprocessor 14, a host computer 16, a set of arrays 18, postprocessing unit 20 and display unit 22. In more detail, in the preferred embodiment the sensors 12 comprise one or more scanning radar sensors, covering a common surveillance region. For example, the scanning sensors 12 may transmit (over line 24) a temporal sequence of image data to a preprocessor 14. Each image comprises a large number of plots with a high clutter density. For example, the image may comprise over one hundred thousand plots. Each image is referred to hereinafter as a "scan". The preprocessor 14 will perform such tasks as gain control, digitization, and data formatting.

The information from the preprocessor 14 is then transmitted along line 26 to the host computer 16 which maps each scan onto the set of arrays 18 comprising plurality of arrays 28, 30, 32 and 34. Each array 28–34 is made up of cells 36. Some of the cells 36 contain data points or plots 35. In each array 28–34 the cells are set "on" if there is a plot mapped onto that cell's location. Each cell 36 corresponds to a subregion of the total surveillance region. For example, each cell may correspond to a subregion which is 0.25 miles/side. It will be appreciated that arrays 28–34 may comprise virtual arrays generated by mapping software 38, or alternatively may actually comprise arrays existing in hardware as described in more detail below.

In any event, as shown in FIG. 1, the arrays are arranged in a stacked configuration. Once the plots in the scans are mapped onto the arrays, the shifting control unit 40 begins the process of shifting the second and subsequent arrays, 30–34 in a spiral pattern. In the software embodiment, the shift control unit 40 will shift the virtual planes, and in a hardware embodiment the shift control unit 40 will control the manual motion of the arrays. In the software version, the motion of the arrays takes place in a step-wise manner as described in more detail below in connection with FIGS. 3A–F. After each step-wise motion of the arrays, each cell in each plane is assigned a new coordinate location which represents its coordinate location with respect to the first stationary array 28. That is, the new, or reference, coordinate location is that coordinate location in the first array 28 that the point now lines up with.

Figure 2:
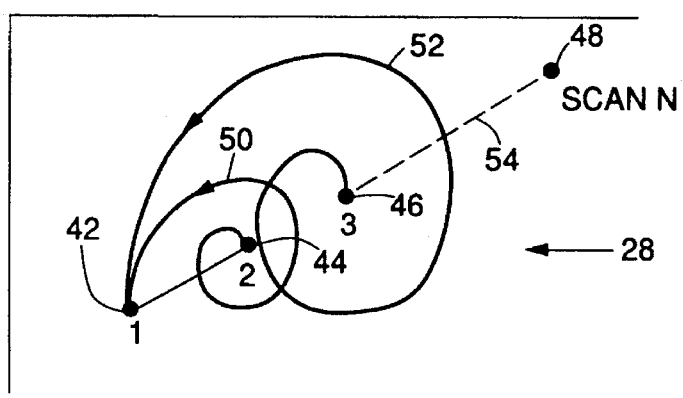
FIG. 2 is a schematic diagram illustrating the motion of correlated points in a three scan example.

To illustrate the spiral motion in more detail, reference is made to FIG. 2 which illustrates the first plane 28 and a single cell 42 in that plane having a plot. Cell 42 is "on" since it contains a plot. Arrays 28–34 are stacked underneath first array 28, and they are not shown in FIG. 2. However, a single cell containing a plot is shown in each array. Thus cell 44 contains a plot in the second plane 30, cell 46 in plane 32 contains a plot and a cell 48 in plane 34 also contains a plot.

Figures 3A, 3B, 3C, 3D:
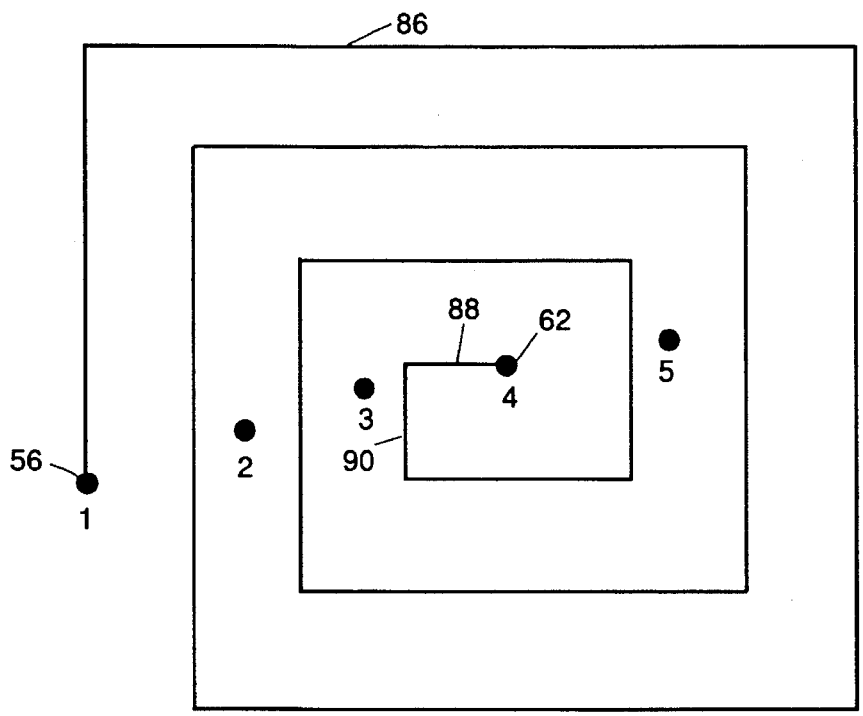
FIGS. 3A–F illustrate the motion of correlated points in a five scan example.

FIG. 2 also illustrates the spiral motion of cells 44 and 46. Line 50 traces the motion 44 of cell 44 and line 52 traces the motion of cell 46. It can be seen that the size of the spiral motion increases for consecutive arrays and cells. This increase will be an amount which is a multiple of the motion of the second array 30 as described in more detail below. In FIG. 2 it can be seen that cells 42, 44, 46 and 48 are equidistant and lie along a straight line 54. This will occur when the plots mapped into cells 42, 44, 46 and 48 represent a constant velocity target detected by sensor 12. This also occurs because the temporal sequence of each scan is taken at equal intervals of time. If the object plotted were not originating from a constant velocity object then the plots would not be equidistant and would not converge at point 42. Referring now to FIGS. 3A–3F, a five scan example of the present invention is shown. FIG. 3A depicts one plot from each of the five scans where the scans are superimposed on top of each other. The plot 56 is from the first scan and represents a cell in the first array. Likewise, plots 58, 60, 62 and 64 represent plots in cells in the second through fifth arrays. It can be seen that plots 56–64 meet the criteria of correlated data points since they are equidistant and collinear.

Referring now to FIG. 3B, in accordance with a preferred embodiment of the present invention, the spiral path 66 of plot 58 is shown. It will be appreciated that the entire second array of which plot 58 is part of will move to create path 66. Plot 58 first moves to the left a distance which approximates the length of a single pixel in the array. That is, the distance of line segment 68 is approximately the intercellular distance in the second array. Likewise, line segment 70 represents the motion of plot 58 in a downward direction one pixel in length. The subsequent motion to the right in line segment 72 and upward in line segment 74 is two pixels in length. The spiral pattern 66 continues in this way increasing the length of line segments by one pixel every other segment, until in the last line segment 76 plot 58 coincides with point 56.

Note that the incremental increase of the line segments, (in this case the length of the first line segment 68,) should be kept small enough to insure that plot number 1, 56 will eventually fall within its path. Of course, this will depend on the criteria used to detect correlation. That is, the size of the detection area surrounding point 56 can be smeared so that correlation will be detected when the subsequent plots do not fall exactly on the first plot 56. This smearing would then allow the spiral to increase in size in larger steps. On the other hand, this process of smearing would also result in a greater likelihood of false correlations which would result when clutter accidently falls within the smeared correlation detection area around point 56.

The detection of the presence of second plot 58 within the correlation region of the first plot 56, will be detected by the correlation identification unit 78. For example, in the software embodiment, after each stepwise motion of the spiral 66 point 58 is assigned a new coordinate location which represents its coordinate location with respect to the first array. The correlation identification unit 78 will check for multiple points having the same coordinate locations as a given plot in the first scan, such as 56. Depending on the application, the correlation identification unit 78 may be configured to identify correlations only when all five plots 56–64 have the same coordinate locations; or alternatively a looser criteria may be established such as requiring four out of five, or three out of five, points to be at the same coordinate location.

Referring now to FIG. 3C, the spiral path 80 of the third plot 60 is shown. The third array, which contains plot 60, is moved in a spiral pattern 80. Spiral pattern 80 is larger than spiral pattern 66 by a factor of two. For example, line segments 82 and 84 are two pixels long as compared to the corresponding line segments 68 and 70 in path 66 which are one pixel long. It can also be seen that spiral 80 intersects the first plot 56. It should be noted that as a result, plot 60 will coincide with plot 56 at the same time that plot 58 coincides with plot 56. This will occur because spiral 80 intersects plot 56 after the same number of steps as it takes spiral 66 to intersect plot 56. As used in this context, a "step" for spiral 66 comprises one pixel of movement and for spiral 80 each step comprises two pixels of movement.

Figure 3E:
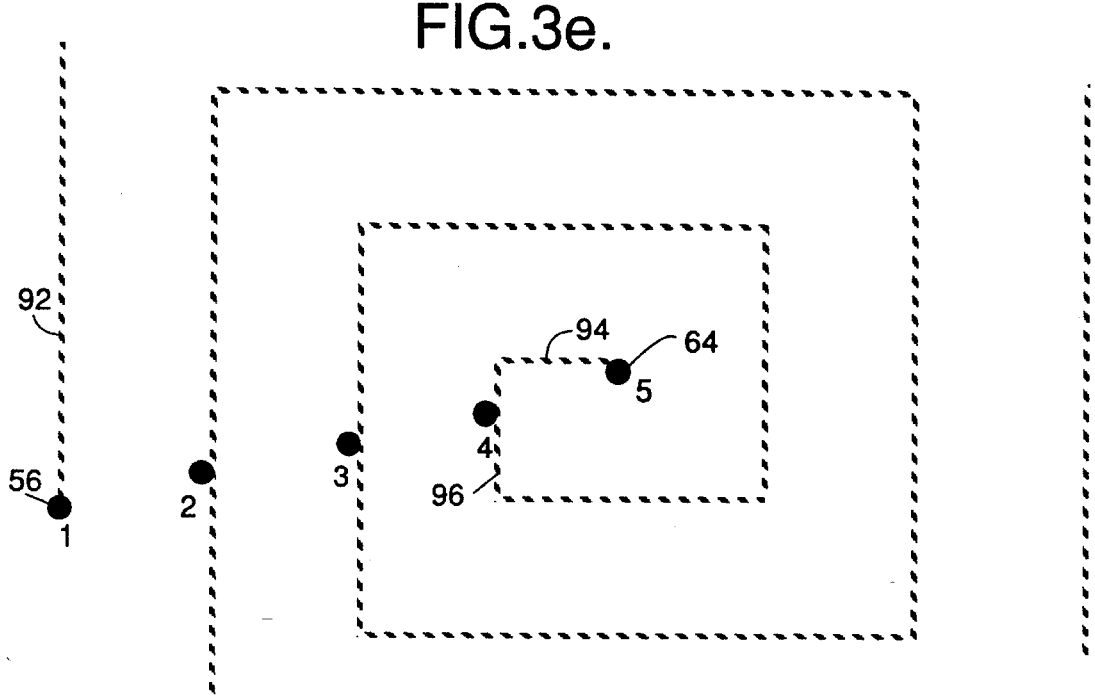

Referring now to FIG. 3D, the spiral path 86 of the fourth plot 62 is shown. It can be seen that this spiral path is again larger than the path 80 shown in FIG 3C. In particular, each step in the motion of the fourth array (which results in the spiral path 80 of the forth plot 62,) comprises a length of three pixels as represented by line segments 88 and 90. As was the case for the third plot 60, the fourth plot 62 will coincide with the first plot 56 after the same number of steps as previous plots 60 and 58. In a similar manner, FIG. 3E depicts the fifth plot 64 and portions of its spiral path 92. Each step-wise motion of the fifth plane containing the fifth plot 64 is four pixels long. For example, line segments 94 and 96 are four pixels long. After the same number of steps as in the previous plots 58, 60, 62 the fifth plot 64 will coincide with the first 56.

Figure 3F:
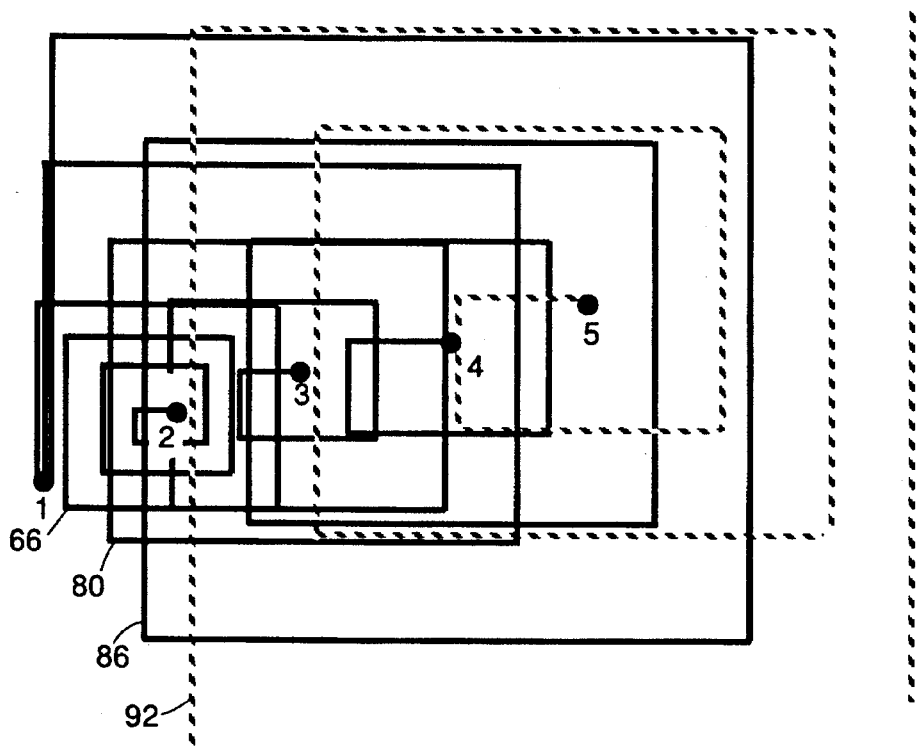

The spiral motions of the second through fifth plots are shown superimposed on each other in FIG. 3F. It should be noted that the time it takes (as measured in number of steps) for all five plots to coincide is proportional to the velocity of the target being plotted. Of course, it will be appreciated that other correlated plots which exist in the scans will converge typically at other times, either earlier or later, than the one shown FIGS. 3A–F. The spiral motion of the five planes will continue until enough steps are taken (ie, the spiral is large enough) to accommodate the highest velocity target anticipated. This is a variable dependant upon system, mission, and site requirements. Once this process is completed, the host computer 16 can transfer the information containing only correlated plots to the postprocessor 20. With the number of clutter points reduced by a typical level of three to four orders of magnitude, the postprocessor 20 can now use conventional techniques to eliminate remaining clutter objects. For example postprocessor 20 may use alpha-beta, Kalman, or multi-hypothesis tracking techniques to perform this postprocessing. Next, postprocessor 20 outputs the final correlated track information for display or use in other subsequent systems depending on the application. For example, the information for postprocessor 20 may be displayed in a display unit 22 and/or used for track initiation.

It should be noted that in noisy environments particularly, as well as with non-exact mapping of plots to pixels, it may be desirable to fatten the cell in which each plot in the planes are located. For example, the cells may represent plots in an extended group of three by three (or larger) pixels surrounding the reported plot position. In this way, non-exact alignment across planes is accommodated. While this will reduce clutter rejection slightly, it will greatly improve noise target track retention.

It will also be appreciated that the present invention is not limited to a two dimensional lattice, but is potentially extendable to higher dimensionality. It should also be noted that since all plots in all scans are moved together and correlated across planes completely simultaneously at each processing step the processing time is independent of the number of plots, scans and sensors in a fully parallel implementation. The only data-dependent time would be in processor/host I/O. For example, the present invention is easily simulated on an IBM/PC, cellular automation accelerator board, Connection Machine, or a Cray computer. It is notable that due to its fine-grained massively parallel nature, the invention is easily segmentable for mapping into such parallel architectures. It should also be appreciated that due to the extraordinary processing speed of the present invention, it is potentially extendable to handle non-constant velocity (maneuvering) targets in real time as well. This may be accomplished by utilizing nonlinear and/or different stepping functions (spirals) for each of the different planes, or by taking scans at very small scan intervals, again different from plane to plane.

Figures 4, 5:
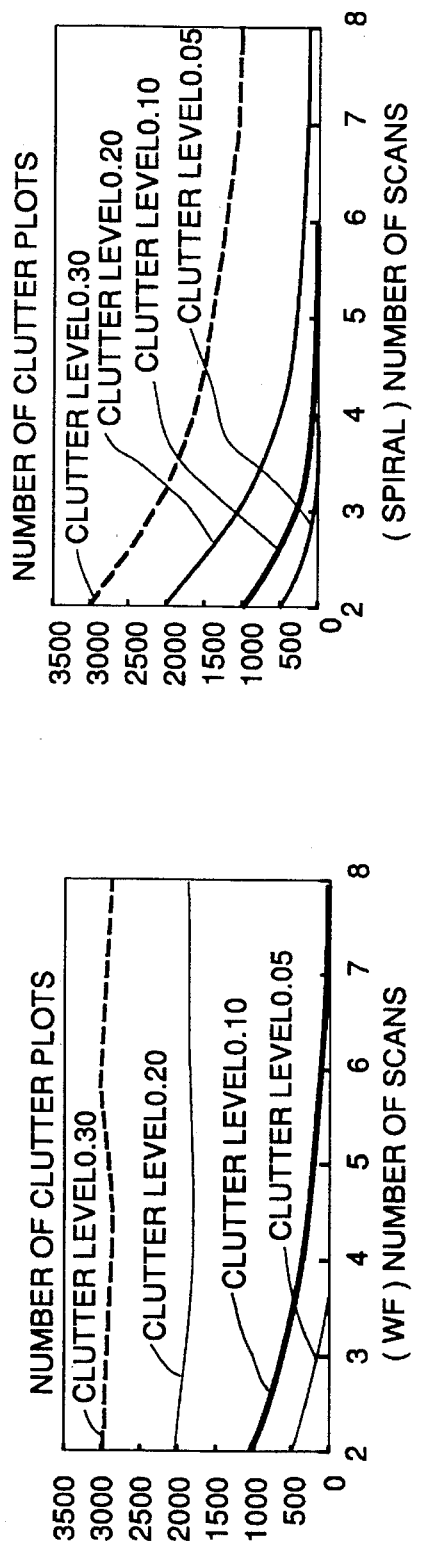
FIG. 4 is a comparison of the performance of the present invention as compared to a wave front processor.
FIG. 5 is a graph of the performance of the present invention illustrating the number of plots qualifying from scan one versus the number of scans.

Referring now to FIG. 4, the clutter rejection processor 10 of the present invention is compared with a wavefront processor in performance. In this case the maximum target speed is 1,000 miles per hour. The simulation results shown in the left chart indicate that performance for a wavefront processor doesn't improve dramatically as a function of the number of scans, while simulation results in the chart on the right for the clutter rejection processor 10 of the present invention shows a dramatic improvement in clutter rejection as a function of the number of scans included in the processing. These curves demonstrate that the current invention does perform clutter rejection at a rate enabling the meeting of the requirements for the massive tracking problem is stated above. Further, FIG. 6 shows the results of a comparison of a wave front processor with the clutter rejection processor 10 of the present invention. In this case, the scenario involves 0.05 clutter per square mile with a cell size of 0.2 miles. Also, each scan contains 200 by 200 cells and three scans were processed. This table compares the performance of both the wavefront and the spiral processor of the present invention verses maximum speed. It can be seen that at lower speeds, the performance is about the same; but with 1,000 and greater miles per hour targets the clutter rejection performance of the present invention far exceeds that of the wavefront processor. For example, at maximum speed of 2,000 miles per hour the wavefront processor yielded 54 invalid tracks based on approximately 128 detections per scan while the present invention yielded only four invalid tracks out of approximately 128 detections per scan. It should be noted that an invalid track does to represent a true target—it results from correlation of clutter points across scans.

Referring now to FIG. 5, a graph of the performance of the present invention is shown. In particular, the number of plots qualifying from scan one is shown verses the number of scans. The number of plots qualifying from scan one corresponds to those plots which remain in scan one after initial processing. In this case, all scan one plots qualified. In this case, the maximum target speed was 1,000 miles per hour, the cell size was 0.5 miles by 0.5 miles, the noise gates, (defined as the value which bounds the "smear" region search across planes to check for correlation) were relatively fat to encompass three by three cells. In this case these results are for a pure clutter rejection problem where there are no true tracks. The noise gates were added to overcome azimuth and range errors which are inherent in any real sensor system and contribute to both fixed and random slight errors in representative of the detection in the 2-D array which is slightly different (offset by a cell or two) from the true location of the target or clutter object. There is 0.1 expected false plots per square mile with 1,512 plots per scan. This corresponds to a clutter level of 0.1 objects/mi$^2$, nominally representation of actual air defense scenarios. The graph in FIG. 5 reveals that with a low number of scans a large number of plots were incorrectly identified as correlating. When the number of scans increased to seven or greater, the number of false plots reached a negligible level.

It will be appreciated that the present invention can be implemented in a number of ways utilizing varying degrees of hardware and software. For example in a primarily hardware approach, the set of arrays 18 may comprise a set of liquid crystal panels. In this embodiment, each array 28–34 comprises a single liquid crystal panel wherein plots are represented by transparent cells on the liquid crystal and the remaining cells are opaque. The correlation identification module 78 then will include a light source and detector which applies light to the first array 28 and a detector which is disposed behind the last array 34. The detector is capable of detecting in which cells light is able to pass through all of the planes. In another embodiment a cellular automation (CA) is used. In more detail, this system will embed each detection as a bit set in a cell in a plane of the CA. Each of the planes will move bits from cell-to-cell, independently of the other planes, in the spiral manner. Electronic gates residing between planes will monitor each cell for set bits, and will set bits in a result plane when correlation occur. After processing, the result plane will be dumped to a host for determination of correlation and plots, and will then be reset. The data in each separate plane will then be moved en masse to the next plane, to make room for the new plane of data.

It should also be appreciated that the spiral shape is the most efficient shape to use to insure complete coverage of all of the areas of all of the planes. However, it will be appreciated that modifications to the spiral shape may be made and may be desirable in certain applications. Those skilled in the art can appreciate that other advantages can be obtained from the use of this invention and that modification may be made without departing from the true spirit of the invention after studying the specification, drawings and following claims.

What is claimed is:

1. A system for correlating multiple sets of data, said system comprising:

a plurality of arrays, each including a mapping of one of said sets of data, the arrays each having coordinate locations, some of which contain data, including either target data which is correlated between sets, or clutter which is uncorrelated between sets;

means for shifting the positions of the second and subsequent arrays with respect to the first array such that the second and subsequent arrays move in a generally spiral pattern which is larger for each successive array, wherein each data point in each shifted array is assigned a new reference coordinate location corresponding to its new location with respect to the first array; and means for identifying, at each said shift, the coordinate locations in the first array which contain data points and which also contain data points in subsequent arrays in their reference coordinate locations, whereby the data points in the identified coordinate locations are correlated with each other.

2. The system of claim 1 wherein said sensor is a radar sensor.

3. The system of claim 1 wherein said arrays comprise on optical mask which is transparent at coordinate locations where said data points reside and opaque at other coordinate locations, and wherein said means for identifying comprising a light source and detector which detects the coordinate locations where said light source passes through each array.

4. The system of claim 1 wherein said sets of data comprise a temporal sequence of data derived from a sensor.

5. The system of claim 4 wherein each set of data is acquired at equal successive time intervals and the length of the movement of each successive array increases by an amount which is a multiple of the movement of the second array.

6. A system for correlating multiple sets of data, said system comprising:

a plurality of arrays, each including a mapping of one of said sets of data, the arrays each having coordinate locations, some of which contain data, including either target data which is correlated between sets or clutter which is uncorrelated between sets;

means for shifting the positions of the second and subsequent arrays with respect to the first array such that the second and subsequent arrays move in a generally spiral pattern which is larger for each successive array, wherein each data point in each shifted array is assigned a new reference coordinate location corresponding to its new location with respect to the first array;

means for identifying, at each said shift, the coordinate locations in the first array which contain data points and which also contain data points in (all) subsequent arrays in their reference coordinate locations, whereby the data points in the identified coordinate locations are correlated with each other and clutter is uncorrelated.

7. The system of claim 6 wherein said sensor is a radar sensor.

8. The system of claim 6 wherein said arrays comprise on optical mask which is transparent at coordinate locations where said data points reside and opaque at other coordinate locations, and wherein said means for identifying comprising a light source and detector which detects the coordinate locations where said light source passes through each array.

9. The system of claim 6 wherein said sets of data comprise a temporal sequence of data derived from a sensor.

10. The system of claim 9 wherein each set of data is acquired at equal successive time intervals and the length of the movement of each successive array increases by an amount which is a multiple of the movement of the second array.

11. A method for correlating multiple sets of data, said method comprising the steps of:

mapping each of said sets of data, into a separate array, the arrays each having coordinate locations, some of which contain data, wherein the data includes either target data which is correlated between sets or clutter which is uncorrelated between sets;

shifting the positions of the second and subsequent arrays with respect to the first array such that the second and subsequent arrays move in a generally spiral pattern which is larger for each successive array, wherein each data point in each shifted array is assigned a new reference coordinate location corresponding to its new location with respect to the first array; and identifying, at each said shift, the coordinate locations in the first array which contain data points and which also contain data points in subsequent arrays in their reference coordinate locations, whereby the data points in the identified coordinate locations are correlated with each other.

12. The method of claim 11 wherein said spiral patterns for each scan is proportionately larger for each successive scan.

13. The method of claim 11 further comprising the step of collection data plots for each scan at regular time intervals and wherein the size of each successive spiral is increased by a constant predetermined amount.

* * * * *